(12) United States Patent
Bent et al.

(10) Patent No.: US 9,244,623 B1
(45) Date of Patent: Jan. 26, 2016

(54) PARALLEL DE-DUPLICATION OF DATA CHUNKS OF A SHARED DATA OBJECT USING A LOG-STRUCTURED FILE SYSTEM

(71) Applicant: EMC Corporation, Hopkinton, MA (US)

(72) Inventors: John M. Bent, Los Alamos, NM (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 321 days.

(21) Appl. No.: 13/799,325

(22) Filed: Mar. 13, 2013

(51) Int. Cl.
*G06F 3/06* (2006.01)
*G06F 17/30* (2006.01)

(52) U.S. Cl.
CPC .............. *G06F 3/0641* (2013.01); *G06F 3/067* (2013.01); *G06F 3/0608* (2013.01); *G06F 3/0619* (2013.01); *G06F 3/0673* (2013.01); *G06F 17/30197* (2013.01)

(58) Field of Classification Search
CPC ... G06F 3/0608; G06F 3/0641; G06F 3/0673; G06F 17/30197
See application file for complete search history.

(56) References Cited

U.S. PATENT DOCUMENTS

2011/0258245 A1* 10/2011 Blocksome et al. .......... 709/201
2014/0136789 A1* 5/2014 Madan et al. ................. 711/133

OTHER PUBLICATIONS

Rosenblum, Mendel, "The Design and Implementation of a Log-Structured File System", Feb. 1992, pp. 26-52.*

* cited by examiner

*Primary Examiner* — Edward Dudek, Jr.
(74) *Attorney, Agent, or Firm* — Ryan, Mason & Lewis, LLP

(57) ABSTRACT

Parallel de-duplication of data chunks being written to a shared object is provided. A client executing on a compute node or a burst buffer node in a parallel computing system stores a data chunk to a shared data object on a storage node by processing the data chunk to obtain a de-duplication fingerprint; comparing the de-duplication fingerprint to de-duplication fingerprints of other data chunks; and providing original data chunks to the storage node that stores the shared object. A reference to an original data chunk can be stored when the de-duplication fingerprint matches another data chunk. The client and storage node may employ Log-Structured File techniques. A storage node stores a data chunk in the shared object by receiving only an original version of the data chunk from a compute node; and storing the original version of the data chunk to the shared data object on the storage node as a shared object.

20 Claims, 4 Drawing Sheets

PARALLEL DE-DUPLICATION OF DATA CHUNKS OF A SHARED DATA OBJECT USING A LOG-STRUCTURED FILE SYSTEM

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. Generally, each parallel process generates a portion, referred to as a data chunk, of a shared data object.

De-duplication is a common technique to reduce redundant data by eliminating duplicate copies of repeating data. De-duplication is to improve storage utilization and also to reduce the number of bytes that must be sent for network data transfers. Typically, unique chunks of data are identified and stored as "fingerprints" during an analysis process. As the analysis progresses, other chunks are compared to the stored copy and when a match is detected, the redundant chunk is replaced with a reference that points to the stored chunk.

Existing approaches de-duplicate the shared data object after it has been sent to the storage system. The de-duplication is applied to offset ranges on the shared data object in sizes that are pre-defined by the file system.

In parallel computing systems, such as High Performance Computing (HPC) applications, the inherently complex and large datasets increase the resources required for data storage and transmission. A need therefore exists for parallel techniques for de-duplicating data chunks being written to a shared object.

SUMMARY

Embodiments of the present invention provide improved techniques for parallel de-duplication of data chunks being written to a shared object. In one embodiment, a method is provided for a client executing on one or more of a compute node and a burst buffer node in a parallel computing system to store a data chunk generated by the parallel computing system to a shared data object on a storage node in the parallel computing system by processing the data chunk to obtain a de-duplication fingerprint; comparing the de-duplication fingerprint to de-duplication fingerprints of other data chunks; and providing original data chunks to the storage node that stores the shared object. In addition, a reference to an original data chunk can be stored when the de-duplication fingerprint matches a de-duplication fingerprint of another data chunk.

The client may be embodied, for example, as a Log-Structured File System (LSFS) client, and the storage node may be embodied, for example, as a Log-Structured File server.

According to another aspect of the invention, a storage node in a parallel computing system stores a data chunk as part of a shared object by receiving only an original version of the data chunk from a compute node in the parallel computing system; and storing the original version of the data chunk to the shared data object on the storage node as a shared object. The storage node can provide the original version of the data chunk to a compute node when the data chunk is read from the storage node.

Advantageously, illustrative embodiments of the invention provide techniques for parallel de-duplication of data chunks being written to a shared object. These and other features and advantages of the present invention will become more readily apparent from the accompanying drawings and the following detailed description.

DETAILED DESCRIPTION

The present invention provides improved techniques for cooperative parallel writing of data to a shared object. Generally, one aspect of the present invention leverages the parallelism of concurrent writes to a shared object and the high interconnect speed of parallel supercomputer networks to de-duplicate the data in parallel as it is written.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices. As used herein, the term "files" shall include complete files and portions of files, such as sub-files or shards.

Figure 1:
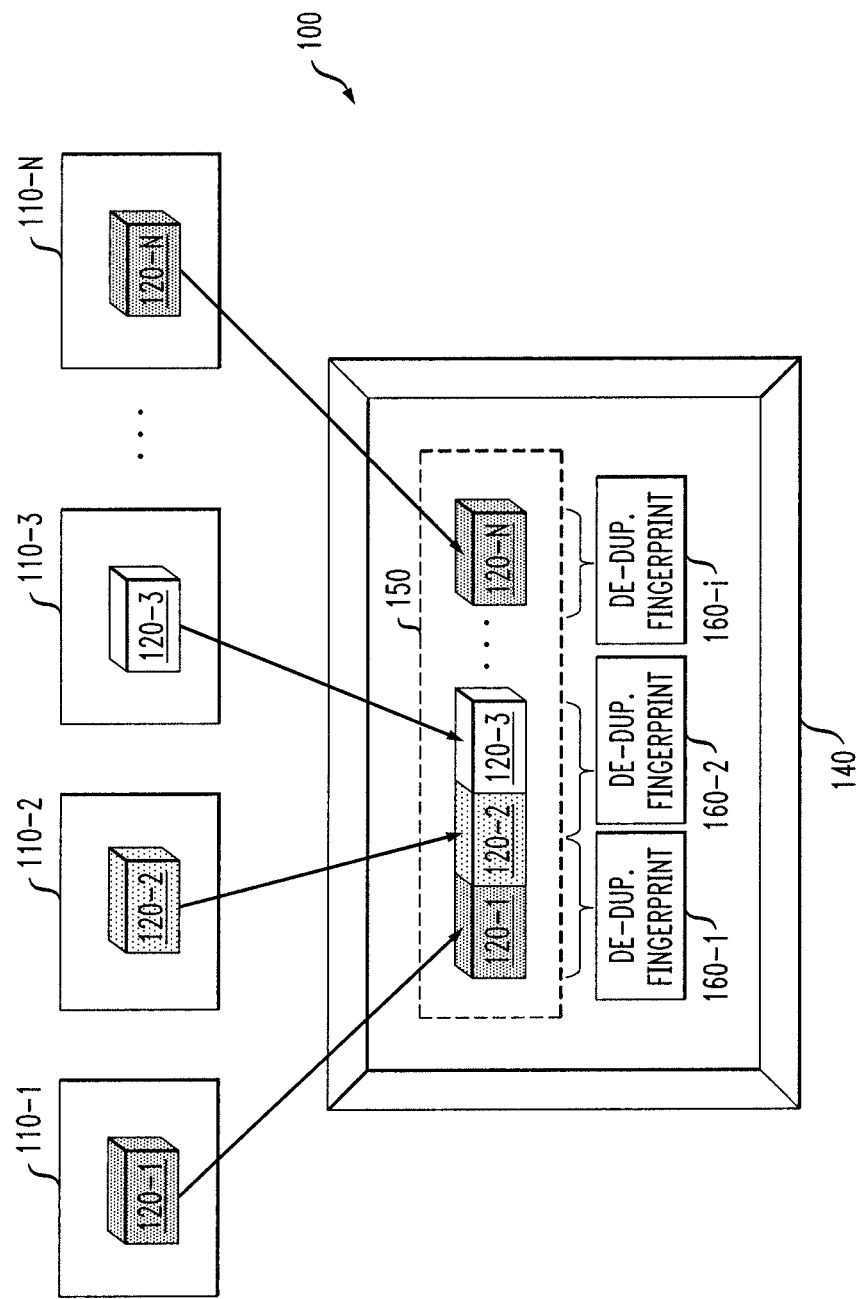
FIG. 1 illustrates an exemplary conventional technique for de-duplicating data being stored to a shared object by a plurality of processes in a storage system.

FIG. 1 illustrates an exemplary conventional storage system 100 that employs a conventional technique for de-duplication of data being stored to a shared object 150 by a plurality of processes. The exemplary storage system 100 may be implemented, for example, as a Parallel Log-Structured File System (PLFS) to make placement decisions automatically, as described in U.S. patent application Ser. No. 13/536,331, filed Jun. 28, 2012, entitled "Storing Files in a Parallel Computing System Using List-Based Index to Identify Replica Files," (now U.S. Pat. No. 9,087,075), incorporated by reference herein, or it can be explicitly controlled by the application and administered by a storage daemon.

As shown in FIG. 1, the exemplary storage system 100 comprises a plurality of compute nodes 110-1 through 110-N (collectively, compute nodes 110) where a distributed application process generates a corresponding portion 120-1 through 120-N of a distributed shared data structure 150 or other information to store. The compute nodes 110 optionally store the portions 120 of the distributed data structure 150 in one or more nodes of the exemplary storage system 100, such as an exemplary flash based storage node 140. In addition, the exemplary hierarchical storage tiering system 100 optionally comprises one or more hard disk drives (not shown).

As shown in FIG. 1, the compute nodes 110 send their distributed data chunks 120 into a single file 150. The single file 150 is striped into file system defined blocks, and then a de-duplication fingerprint 160-1 through 160-$i$ is generated for each block. As indicated above, existing de-duplication approaches process the shared data structure 150 only after it has been sent to the storage node 140 of the storage system 100. Thus, as shown in FIG. 1, the de-duplication is applied to offset ranges on the data in sizes that are pre-defined by the file system 100. The offset size of the de-duplication does not typically align with the size of the data portions 120 (i.e., the file system defined blocks will typically not match the original memory layout).

Figure 2:
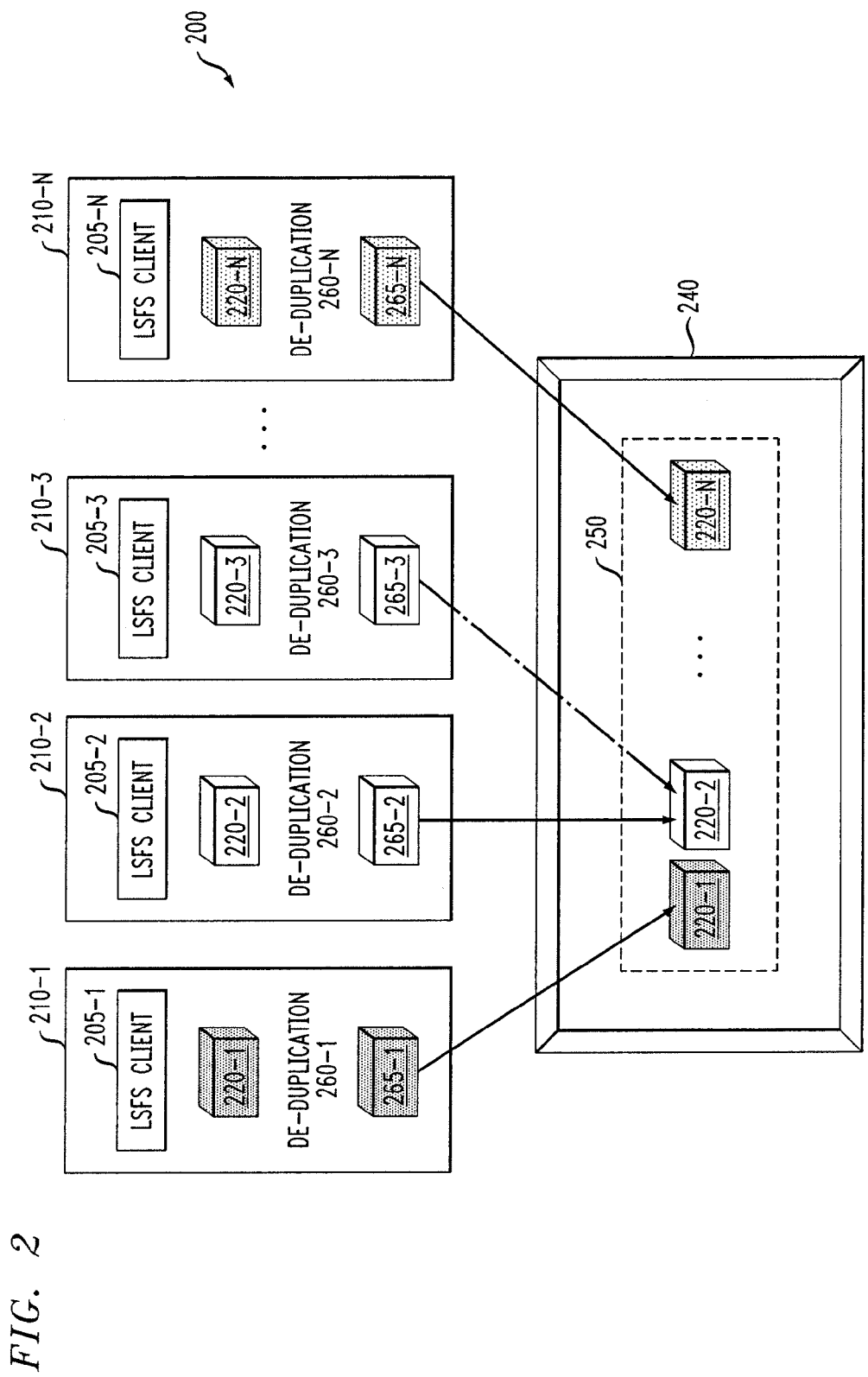
FIG. 2 illustrates an exemplary distributed technique for de-duplication of data being stored to a shared object by a plurality of processes in a storage system in accordance with aspects of the present invention.

FIG. 2 illustrates an exemplary storage system 200 that de-duplicates data chunks 220 being stored to a shared object 250 by a plurality of processes in accordance with aspects of the present invention. The exemplary storage system 200 may be implemented, for example, as a Parallel Log-Structured File System.

As shown in FIG. 2, the exemplary storage system 200 comprises a plurality of compute nodes 210-1 through 210-N (collectively, compute nodes 210) where a distributed application process generates a corresponding data chunk portion 220-1 through 220-N (collectively, data chunks 220) of a distributed shared data object 250 to store. The distributed application executing on given compute node 210 in the parallel computing system 200 writes and reads the data chunks 220 that are part of the shared data object 250 using a log-structured file system (LSFS) client 205-1 through 205-N executing on the given compute node 210.

In accordance with one aspect of the present invention, on a write operation, each LSFS client 205 applies a corresponding de-duplication function 260-1 through 260-N to each data chunk 220-1 through 220-N to generate a corresponding fingerprint 265-1 through 265-N that is compared to other fingerprints. When a match is detected, the redundant chunk 220 is replaced with a reference that points to the stored chunk. In the example of FIG. 2, chunk 220-3 is a duplicate of chunk 220-2 so only chunk 220-2 is stored and a reference pointing to the stored chunk 220-2 is stored for chunk 220-3, in a known manner.

Each original data chunk 220 is then stored by the corresponding LSFS client 205 on the compute nodes 210 on one or more storage nodes of the exemplary storage system 200, such as an exemplary LSFS server 240. The LSFS server 240 may be implemented, for example, as a flash based storage node. In addition, the exemplary hierarchical storage tiering system 200 optionally comprises one or more hard disk drives (not shown).

The parallelism of the compute nodes 210 can also be also leveraged to build a parallel key server to help find the de-duplicated fingerprints 265. The keys can be cached across the compute server network 200.

Figure 3:
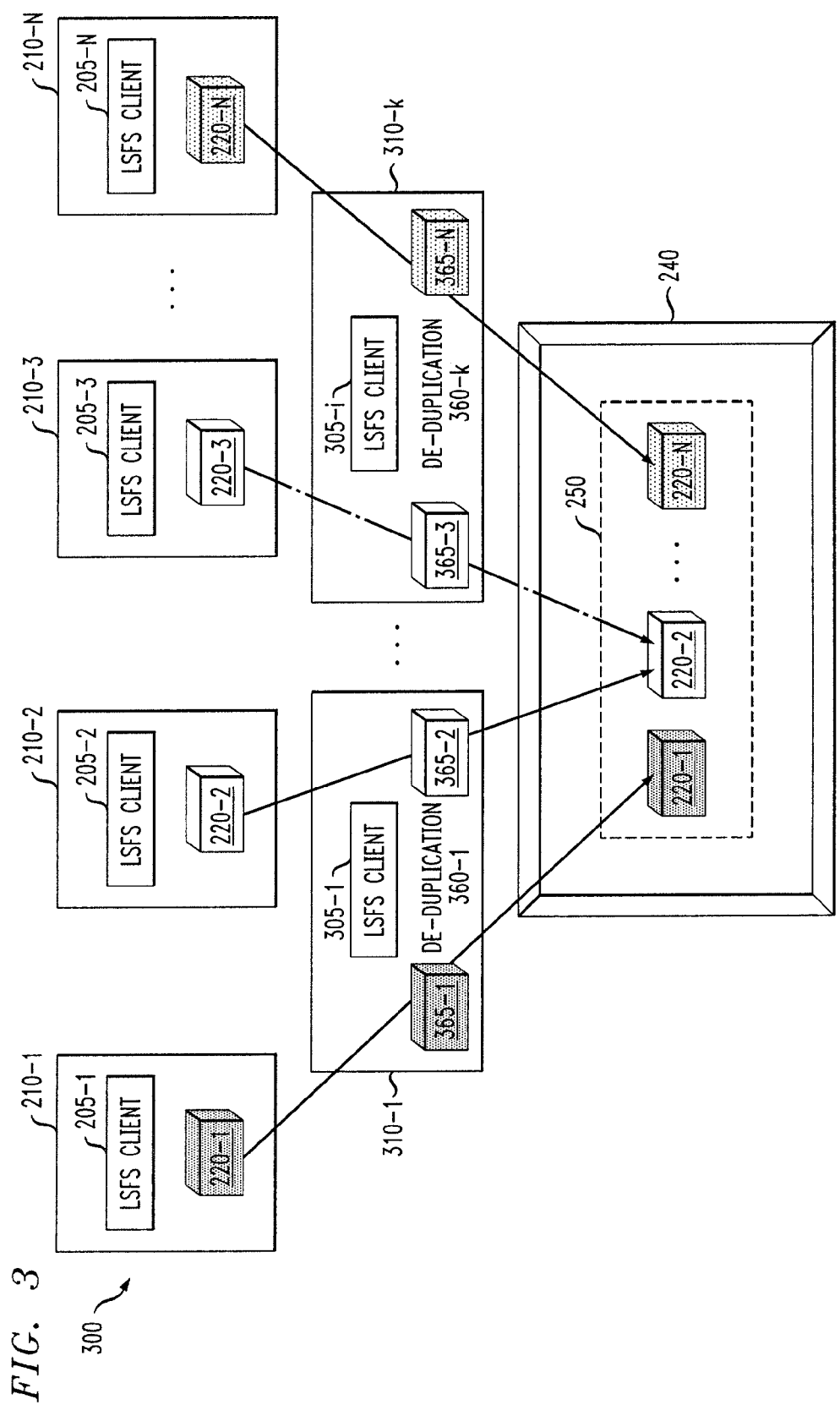
FIG. 3 illustrates an exemplary alternate distributed technique for de-duplication of data being stored to a shared object by a plurality of processes in a storage system in accordance with an alternate embodiment of the present invention.

FIG. 3 illustrates an exemplary storage system 300 that de-duplicates data chunks 220 being stored to a shared object 250 by a plurality of processes in accordance with an alternate embodiment of the present invention. The exemplary storage system 300 may be implemented, for example, as a Parallel Log-Structured File System. As shown in FIG. 3, the exemplary storage system 300 comprises a plurality of compute nodes 210-1 through 210-N (collectively, compute nodes 210) where a distributed application process generates a corresponding data chunk portion 220-1 through 220-N (collectively, data chunks 220) of a distributed shared data object 250 to store, in a similar manner to FIG. 2. The distributed application executing on given compute node 210 in the parallel computing system 200 writes and reads the data chunks 220 that are part of the shared data object 250 using a log-structured file system (LSFS) client 205-1 through 205-N executing on the given compute node 210, in a similar manner to FIG. 2.

As discussed hereinafter, following de-duplication, each original data chunk 220 from the distributed data structure 250 is stored in one or more storage nodes of the exemplary storage system 200, such as an exemplary LSFS server 240. The LSFS server 240 may be implemented, for example, as a flash based storage node. In addition, the exemplary hierarchical storage tiering system 200 optionally comprises one or more hard disk drives (not shown).

The exemplary storage system 300 also comprises one or more flash-based burst buffer nodes 310-1 through 310-$k$ that process the data chunks 220 that are written by the LSFS clients 205 to the LSFS server 240, and are read by the LSFS clients 205 from the LSFS server 240. The exemplary flash-based burst buffer nodes 310 comprise LSFS clients 305 in a similar manner to the LSFS clients 205 of FIG. 2.

In accordance with one aspect of the present invention, on a write operation, each burst buffer node 310 applies a de-duplication function 360-1 through 360-$k$ to each data chunk 220-1 through 220-N to generate a corresponding fingerprint 365-1 through 365-N. Each original data chunk 220 is then stored on the LSFS server 240, in a similar manner to FIG. 2.

On a burst buffer node 310, due to the bursty nature of the workloads, there is additional time to run computationally intensive de-duplication.

It is noted that the embodiments of FIGS. 2 and 3 can be combined such that a first level de-duplication is performed by the LSFS clients 205 executing on the compute nodes 210 and additional more computationally intensive de-duplication is performed by the burst buffer nodes 310.

While such distributed de-duplication may reduce performance due to latency, this is outweighed by the improved storage and transmission efficiency. Additionally, on the burst buffer nodes 310, this additional latency will not be incurred by the application since the latency will be added not between the application on the compute nodes 210 and the burst buffer nodes 310 but between the asynchronous transfer from the burst buffer nodes 310 to the lower storage servers 240.

Figure 4:
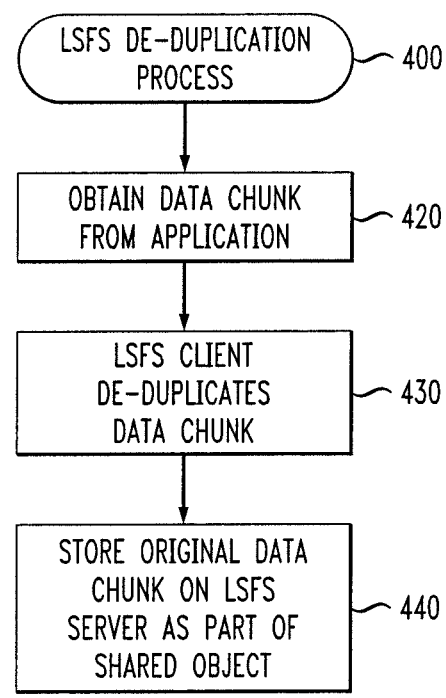
FIG. 4 is a flow chart describing an exemplary LSFS de-duplication process incorporating aspects of the present invention.

FIG. 4 is a flow chart describing an exemplary LSFS de-duplication process 400 incorporating aspects of the present invention. The exemplary LSFS de-duplication process 400 is implemented by the LSFS clients 205 executing on the compute nodes 210 in the embodiment of FIG. 2 and by the flash-based burst buffer nodes 310 in the embodiment of FIG. 3.

As shown in FIG. 4, the exemplary LSFS de-duplication process 400 initially obtains the data chunk from the application during step 420. The exemplary LSFS de-duplication process 400 then de-duplicates the data chunk during step 430 on the compute nodes 210 or the burst buffer nodes 310.

Finally, the original data chunks are stored on the LSFS server 240 as part of the shared object 250 during step 440.

Among other benefits, the number of compute servers 210 as shown in FIG. 2, is at least an order of magnitude greater than the number of storage servers 240 in HPC systems, thus it is much faster to perform the de-duplication on the compute servers 210. In addition, the de-duplication is performed on the data chunks 220 as they are being written by the LSFS client 205 as opposed to when they have been placed into the file 250 by the server 240. The advantage is that in a conventional approach, the data chunks 120 on the compute node 110 may be completely reorganized when the server 140 puts them into the shared file 150, as shown in FIG. 1. In fact, the data chunks 120 may be split into many smaller sub-chunks and interspersed with small sub-chunks from other compute nodes 110. The original chunking of the data is the most likely to have commonality with other chunks. Thus, this reorganization with the conventional approach may reduce the de-duplicability of the data.

The chunks 220 in a log-structured file system retain their original data organization whereas in existing approaches, the data in the chunks will almost always be reorganized into file system defined blocks. This can introduce additional latency as the file system will either wait for the blocks to be filled or do the de-duplication multiple times each time the block is partially filled.

In this manner, aspects of the present invention leverage the parallelism of concurrent writes to a shared object and the high interconnect speed of parallel supercomputer networks to improve data de-duplication during a write operation. Aspects of the present invention thus recognize that the log-structured file system eliminates the need for artificial file system boundaries because all block sizes perform equally well in a log-structured file system.

Because PLFS files can be shared across many locations, data processing required to implement these functions can be performed more efficiently when there are multiple nodes cooperating on the data processing operations. Therefore, when this is run on a parallel system with a parallel language, such as Message Passing Interface (MPI), PLFS can provide MPI versions of these functions which will allow it to exploit parallelism for more efficient data processing.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

In one or more exemplary embodiments, a tangible machine-readable recordable storage medium stores one or more software programs, which when executed by one or more processing devices, implement the data deduplication techniques described herein.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    processing a data chunk generated by a parallel computing system using a Log-Structured File System client to obtain a de-duplication fingerprint, wherein said Log-Structured File System client executes on one or more of a compute node and a burst buffer node in said parallel computing system;
    storing said de-duplication fingerprint using said Log-Structured File System client in a parallel key server;
    comparing said de-duplication fingerprint using said Log-Structured File System client to de-duplication fingerprints of other data chunks obtained from said parallel key server; and
    providing original data chunks to said storage node in said parallel computing system for storage as part of a shared object.

2. The method of claim 1, wherein said storage node comprises a Log-Structured File server.

3. The method of claim 1, further comprising the step of storing a reference to an original data chunk when said de-duplication fingerprint matches a de-duplication fingerprint of another data chunk.

4. The method of claim 1, wherein said storage node receives only said original version of said data chunk from said compute node.

5. The method of claim 4, further comprising the step of said storage node providing said original version of said data chunk to one or more compute nodes when said data chunk is read from said storage node.

6. The method of claim 1, wherein said data chunk has a variable block size.

7. The method of claim 1, wherein said method is performed during a write operation.

8. A non-transitory machine-readable recordable storage medium, wherein one or more software programs when executed by one or more processing devices implement the following steps:
    processing a data chunk generated by a parallel computing system using a Log-Structured File System client to obtain a de-duplication fingerprint, wherein said Log-Structured File System client executes on one or more of a compute node and a burst buffer node in said parallel computing system;
    storing said de-duplication fingerprint using said Log-Structured File System client in a parallel key server;
    comparing said de-duplication fingerprint using said Log-Structured File System client to de-duplication fingerprints of other data chunks obtained from said parallel key server; and
    providing original data chunks to said storage node in said parallel computing system for storage as part of a shared object.

9. The storage medium of claim 8, further comprising the step of storing a reference to an original data chunk when said de-duplication fingerprint matches a de-duplication fingerprint of another data chunk.

10. The storage medium of claim 9, further comprising the step of said storage node providing said original version of said data chunk to one or more compute nodes when said data chunk is read from said storage node.

11. The apparatus of claim 10, wherein said storage node is configured to provide said original version of said data chunk to one or more compute nodes when said data chunk is read from said storage node.

12. The storage medium of claim 8, wherein said storage node receives only said original version of said data chunk from said compute node.

13. The storage medium of claim 8, wherein said data chunk has a variable block size.

14. The storage medium of claim 8, wherein said processing, storing, comparing and providing steps are performed during a write operation.

15. An apparatus, said apparatus comprising:
a memory; and
at least one hardware device operatively coupled to the memory and configured to:
process a data chunk generated by a parallel computing system using a Log-Structured File System client to obtain a de-duplication fingerprint, wherein said Log-Structured File System client executes on one or more of a compute node and a burst buffer node in said parallel computing system;
store said de-duplication fingerprint using said Log-Structured File System client in a parallel key server;
compare said de-duplication fingerprint using said Log-Structured File System client to de-duplication fingerprints of other data chunks obtained from said parallel key server; and
provide original data chunks to said storage node in said parallel computing system for storage as part of a shared object.

16. The apparatus of claim 15, wherein said storage node comprises a Log-Structured File server.

17. The apparatus of claim 15, wherein said apparatus comprises one or more of a compute node and a burst buffer node.

18. The apparatus of claim 15, wherein said at least one hardware device is further configured to store a reference to an original data chunk when said de-duplication fingerprint matches a de-duplication fingerprint of another data chunk.

19. The apparatus of claim 15, wherein said storage node receives only said original version of said data chunk from said compute node.

20. The apparatus of claim 15, wherein said data chunk has a variable block size.

* * * * *